United States Patent [19]

New

[11] Patent Number: 5,971,616
[45] Date of Patent: Oct. 26, 1999

[54] THRUST BEARING ARRANGEMENT

[75] Inventor: Nigel H New, Harrow, United Kingdom

[73] Assignee: The Glacier Metal Company Limited, United Kingdom

[21] Appl. No.: 09/077,918

[22] PCT Filed: Dec. 2, 1996

[86] PCT No.: PCT/GB96/02969

§ 371 Date: Jun. 5, 1998

§ 102(e) Date: Jun. 5, 1998

[87] PCT Pub. No.: WO97/21935

PCT Pub. Date: Jun. 19, 1997

[30] Foreign Application Priority Data

Dec. 14, 1995 [GB] United Kingdom .................... 9525561

[51] Int. Cl.[6] ....................................................... F16C 17/06
[52] U.S. Cl. ............................................ 384/122; 384/308
[58] Field of Search .................................... 384/117, 122, 384/306, 308, 309, 312, 105, 106

[56] References Cited

U.S. PATENT DOCUMENTS

| | | | |
|---|---|---|---|
| 3,142,519 | 7/1964 | Abramovitz | 384/308 |
| 3,565,498 | 2/1971 | Leopard et al. | 384/306 X |
| 3,937,534 | 2/1976 | Welch | 384/420 |
| 4,208,076 | 6/1980 | Gray et al. | 384/105 |
| 4,227,753 | 10/1980 | Wilcock | 384/105 |
| 4,475,824 | 10/1984 | Glaser et al. | 384/306 |
| 4,767,221 | 8/1988 | Paletta et al. | 384/106 |

FOREIGN PATENT DOCUMENTS

| | | |
|---|---|---|
| 277102 | 11/1951 | Switzerland . |
| 382843 | 11/1932 | United Kingdom . |
| 1075140 | 7/1967 | United Kingdom . |
| 1 241 098 | 7/1971 | United Kingdom . |
| 1 535 165 | 12/1978 | United Kingdom . |

*Primary Examiner*—Thomas R. Hannon
*Attorney, Agent, or Firm*—Nixon & Vanderhye P.C.

[57] ABSTRACT

A tilting pad thrust bearing assembly comprises an annular body which carries an array of bearing pads either as discrete pads or in an integral ring. The pads are manufactured with opposite faces flat, that is, without the usual radially extending fulcrum ridges, such ridges being provided by a shim member disposed between the pads and a correspondingly flat surface of the carrier body. The fulcrum ridges are defined by folded back tabs displacing the shim material or by pleating the shim material. This construction permits the consumable bearing pads to be made profitable more easily and cheaply.

15 Claims, 4 Drawing Sheets

THRUST BEARING ARRANGEMENT

BACKGROUND AND SUMMARY OF THE INVENTION

This invention relates to thrust bearing arrangements for apparatus having a rotatable shaft about which shaft are arrayed a plurality of axially facing thrust pad surfaces, and in particular to tilting pad thrust bearing arrangements in which individual thrust pad surfaces are able to tilt or rock to a limited extent about a generally radially extending fulcrum ridge.

Tilting pad thrust bearing arrangement are well known per se, having either discrete bearing pads or an integral ring of pads joined to each other by webs of pad material that are thin enough to permit the individual pads to tilt relative to supporting carrier means of the pads and against which, in both forms, the pads bear to transmit axial thrust forces.

The supporting carrier means is formed either as a metal ring of such thickness as to support the thrust loads without deformation or sometimes as a prepared surface of the apparatus housing the bearing arrangement. In either case it is conventional for the pad-supporting face of the carrier means to be substantially flat in the axial direction, except possibly for lubricant nozzles at the surface at locations between adjacent pads, and for the face of each thrust pad opposite to a bearing surface to be machined away except at a central or circumferentially offset location to leave a radially-extending fulcrum ridge by way of which the pad is supported on said supporting face of the carrier means and about which fulcrum ridge it is able to make limited tilting movements.

It will be appreciated that in the case of individual pads or an integral ring of such pads, the provision of such fulcrum ridge on the supported pad surfaces involves an additional and non-trivial manufacturing stage the cost of which may not be fully realised during the life of the bearing arrangement because the machined ridge is upon a consumable item and discarded with any bearing pad that needs replacing due to wear of the opposite, bearing face.

GB-A-1535165 describes a thrust bearing arrangement wherein parallel surfaced bearing pads are supported on a smooth faced carrier by way of an intervening plate machined such that it presents an upstanding fulcrum ridge to each bearing pad. Whereas this construction permits the consumable components, the bearing pads, to be of simpler and cheaper construction, the machined plate nevertheless requires considerable manufacturing effort and, by virtue of its manufacture, has dimensions which add significantly to those of the bearing arrangement.

It is an object of the present invention to provide a tilting pad thrust bearing assembly which is simpler and more cost-effective to manufacture and use.

According to the present invention a tilting pad thrust bearing arrangement comprises a plurality of flat parallel faced bearing pads arrayed about a longitudinal axis and supported on pad carrier means, comprising a carrier body having a flat support face extending about the longitudinal axis and between said support face and the bearing pads support means defining associated with each pad a support member including a substantially radially extending fulcrum ridge about which the supported pad can tilt, each support member comprising a shim member formed by a thin flexible shim material of substantially uniform thickness and each fulcrum ridge by adjacent integral parts of the material overlying each other in face to face contact.

Figure 1A:
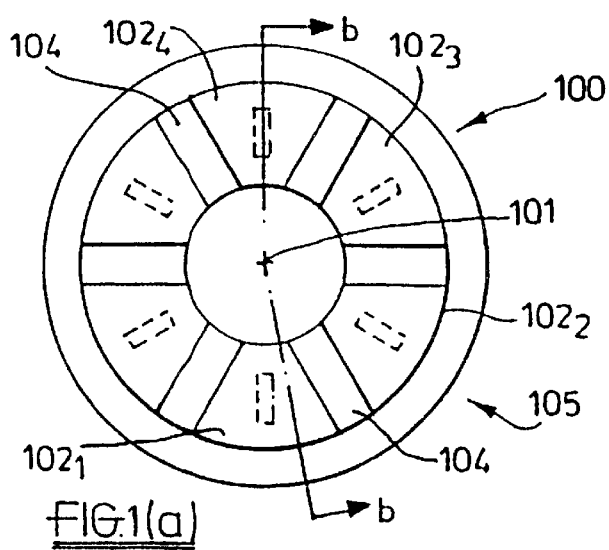
FIG. 1(a) is a plan view of a first embodiment of tilting pad thrust bearing assembly in accordance with the present invention having carrier means in the form of a load bearing annular body, a unitary ring of bearing pads and therebetween shim means in the form of members of uniform thickness, the material of which is displaced as folded back tabs to define fulcrum ridges, joined as a unitary shim member ring.

and (b) in which the locating holes extent through the fulcrum ridge, and

FIGS. 8(a) to 8(d) are sectional elevations through shim members illustrating different members of increasing fulcrum ridge thickness.

DETAILED DESCRIPTION OF THE DRAWINGS

Referring to FIGS. 1(a) to 1(e), a first embodiment of the bearing arrangement according to the invention, indicated at 100, is centred on longitudinal axis 101 and comprises a plurality of flat parallel surfaced bearing pads $102_1$, $102_2$, $102_3$ . . . arrayed about the longitudinal axis. The bearing pads have respective bearing surfaces $103_1$, $103_2$, $103_3$ . . . and opposite thereto parallel supported surfaces $103'_1$, $103'_2$, . . . and are joined to each other remote from their bearing surfaces by a relatively thin flexible web 104. The ring of bearing pads is supported on carrier means, indicated generally at 105, comprising an annular carrier body 106 of mild steel of axial thickness of between 5 mm and 10 mm, or of other suitable material, having a flat support face 107.

Between the support face 107 and supported faces $103'_1$, $103'_2$ . . . of the bearing pads is support means, indicated generally at 108, that has associated with each bearing pad a support member including a radially extending fulcrum ridge about which the pad supported thereon can tilt.

In accordance with the invention the support means comprises shim means indicated generally at 110 formed by a thin flexible shim material of substantially uniform thickness and each support member comprises a shim member $112_1$, $112_2$ . . . in which the fulcrum ridge is formed by adjacent integral parts of the material overlying each other in face-to-face contact.

The shim means extends in directions generally circumferential and radial with respect to each associated bearing pad and is formed from steel having a thickness less than 3 mm, and preferably 0.5 mm or less, or of material having suitable strength, flexibility and working properties. For convenience in association with a ring of bearing pads the individual shim members $112_1$, $112_2$, . . . are joined as a planar unitary annular shim member ring 112. Each of the effective individual shim members includes, a respective fulcrum ridge $115_1$, $115_2$, . . . in the form of a tab $116_1$, $116_2$, . . . of shim material, defined by circumferentially and radially extending slits $117_1$, $117_2$ . . . through the shim material and folded out of the plane of the shim member to lie against, and parallel to, an adjacent portion of the shim member.

The displacement of each tab is shown as being in a direction towards the bearing pad so that the pad when untilted abuts only the flattened crest of the tab displacement and the remainder of the shim member is borne on the surface 107 of the annular body 106, but it will be appreciated that the displacement may be in the opposite direction such that the fulcrum ridge abuts the surface of the annular body and the bearing pad is supported on the greater expanse of shim member.

The annular body 106 has at least two through-apertures 120, 121 therein through which headed locating screws 122 or the like can extend by way of a clearance fit to threaded or interference engagement with the thrust pad ring. The clearance of the locating screws with respect to the carrier body is such that the thrust pad ring is held against radial and circumferential displacement with respect thereto but permitted limited axial displacement insofar as this is confined to that necessary to permit tilting function of the thrust pad components $102_1$, $102_2$ . . . about the fulcrum ridges.

It is found by calculation that for a wide variety of bearing pad sizes a required degree of tilt is provided by a single thickness of shim means material of less that 0.5 mm thickness. In fact a thickness down to 0.025 mm may suffice, although difficulties may be encountered in handling the material and shim means formed therefrom.

Figure 2A:
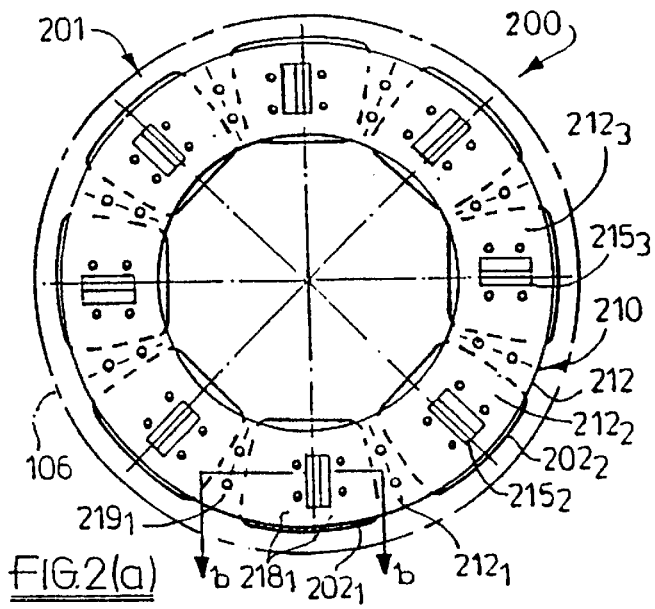
FIG. 2(a) is a plan view by way of the carrier body of a second embodiment of bearing arrangement in accordance with the present invention, in which discrete bearing pads are supported on carrier means, including a load bearing annular body (shown ghosted), by way of a unitary annular shim member ring having folded-tab fulcrum ridges and wherein the pads, shim member ring and annular body of the carrier means are secured to each other at intervals by spot welds.
Figure 2B:
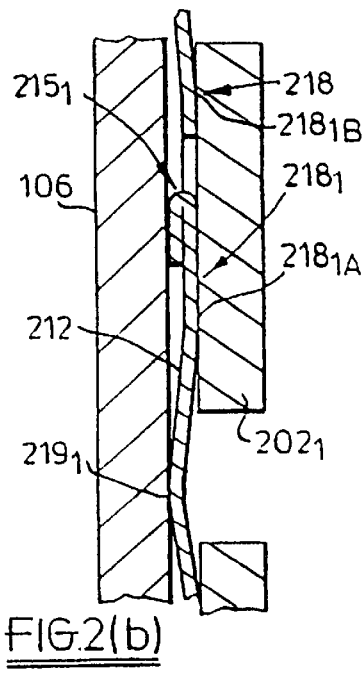
FIG. 2(b) is a sectional elevation through the arrangement of FIG. 2(a) along the line b—b thereof.

Referring to FIGS. 2(a) and 2(b), a second embodiment of bearing arrangement 200 is shown viewed from the direction of the annular body 106 of the carrier means (which is ghosted) to show the structure of the shim means. The arrangement has the ring of bearing pads, indicated generally at 201, formed of discrete pads $202_1$, $202_2$ . . . not connected to each other by web means, and the shim means, 210, comprises a unitary annular shim member 212 corresponding to the shim member 112 in respect of the fulcrum ridges $215_1$, $215_2$, and comprising effective individual shim members $212_1$, $212_2$, . . . associated with the individual pads that are joined to each other.

The arrangement also differs from the previously described embodiments by the form of locating means, each bearing pad $202_1$, $202_2$ . . . being secured to the associated part of the shim member only and the shim member 212 being secured to the annular body 106 such that the it is prevented from moving circumferentially and radially with respect to the annular body and bearing pad. Each part of the shim member, say $212_1$, is secured to the associated bearing pad $202_1$, at $218_1$, adjacent the fulcrum ridge and to the annular body at a position $219_1$ between adjacent bearing pads, that is, laterally of the pad where it is accessible from the front (bearing surface side) of the pad. Preferably the shim member is secured to the pad at two radially spaced points, $218_{1A}$, $218_{1B}$, to prevent the member responding to rotational forces. Also conveniently, the member is secured at said points by spot welds or the like.

It will be appreciated that there as the array of bearing pads may be secured to the annular shim member before disposing them with respect to the annular body, with full access to surfaces thereof, securing of the shim means to the annular body may only be possible by way of the spaces between adjacent pads. Whereas it is convenient as illustrated to secure each effective shim member of the ring to the annular body adjacent each bearing pad, the ring as a unitary body may be secured at fewer locations.

It will be apparent from FIG. 2(a) and the method of securing each effective shim member of the ring to both the associated pad and region of the carrier body, that the shim members need not be joined integrally in the form of a unitary annular shim member ring.

Figure 3A:
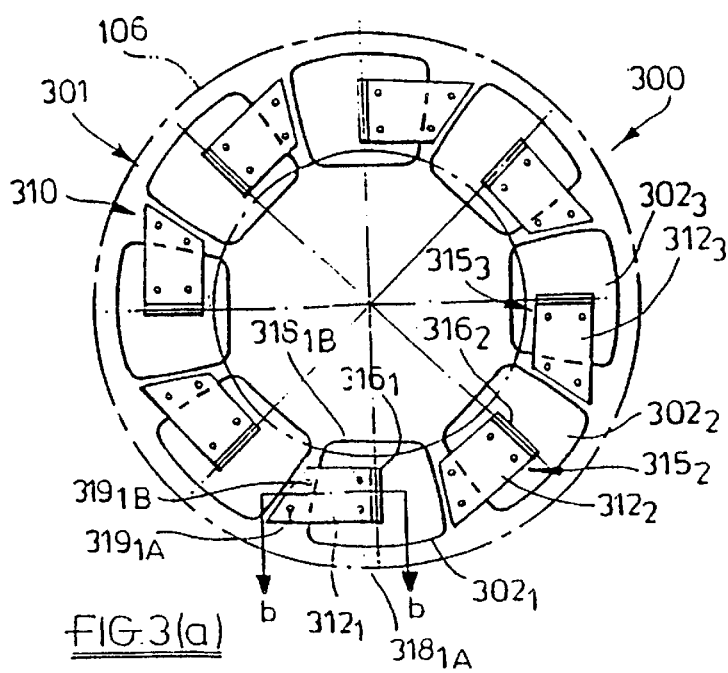
FIG. 3(a) is a plan view of a third embodiment of a bearing arrangement in accordance with the present invention comprising discrete bearing pads, each supported on carrier means including a load bearing annular body (shown ghosted), and shim means in the form of a discrete rectilinear shim member for each pad, secured by spot welds to the pad adjacent the fulcrum ridge and to the annular body at a position between adjacent pads.
Figure 3B:
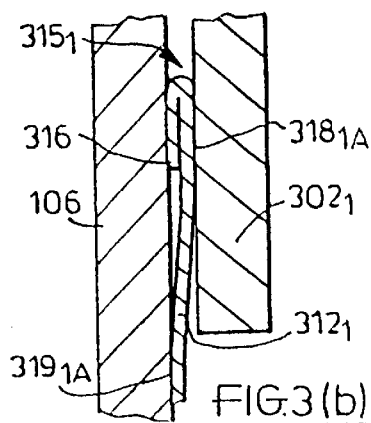
FIG. 3(b) is a sectional elevation through the arrangement of FIG. 3(a) along the line b—b thereof.

Referring to FIGS. 3(a) and 3(b), a third embodiment of bearing arrangement 300 is shown viewed from the direction of the annular body 106 of the carrier means (which is ghosted) to show the structure of the shim means. The arrangement has the ring of bearing pads, indicated generally at 301, formed of discrete pads $302_1$, $302_2$ . . . not connected to each other by web means, and the shim means, 310, comprises a discrete member $312_1$, $312_2$ . . . associated with each discrete pad rather than a unitary annular member. Each shim member extends generally circumferentially with respect to the pad but, being radially smaller, conveniently as a rectilinear strip extending tangentially rather than arcuately in a truly circumferential direction. Each fulcrum ridge $315_1$, $315_2$ . . . is formed as a folded tab $316_1$, $316_2$ . . . , but from an end of the strip folded back and extending radially for the full width of the strip.

Each shim member strip, say $312_1$, is secured to the associated bearing pad $302_1$ at $318_2$ adjacent the fulcrum ridge and to the annular body at a position $319_1$ between adjacent bearing pads, that is, laterally of the pad where it is accessible from the front (bearing surface side) of the pad. Preferably the shim member is secured to the pad at two radially spaced points, $318_{1A}$, $318_{1B}$, and to the body at two radially spaced points $319_{1A}$, $319_{1B}$, to prevent the member responding to rotational forces. Also conveniently, the member is secured at said points by spot welds or the like.

It will be appreciated that other forms of locating means may be employed both with discrete shim members and shim members joined together as a unitary shim member ring.

Figure 4A:
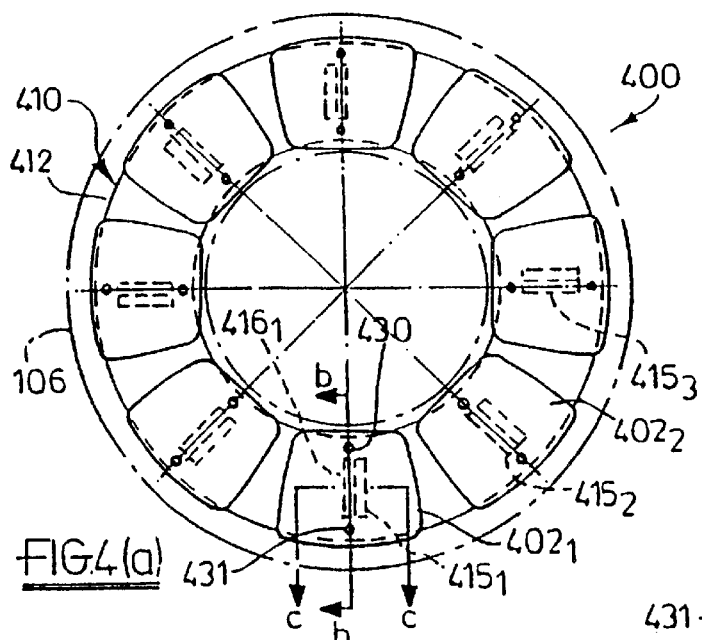
FIG. 4(a) is a plan view of a fourth embodiment of the present invention, similar to that of FIG. 2(a), but in which each of the bearing pads and the annular body of the carrier means are located with respect to each other by a pair of locating members formed by curled spring pins.
Figure 4B:
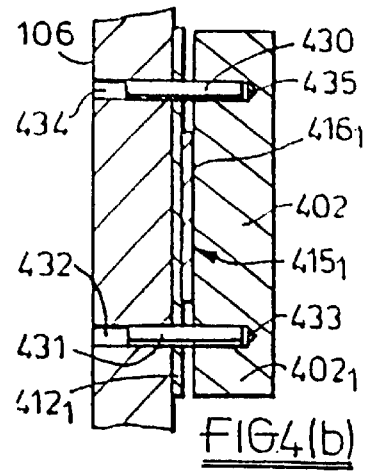
FIG. 4(b) is a sectional elevation through the arrangement of FIG. 4(a) in the direction b—b.
Figure 4C:
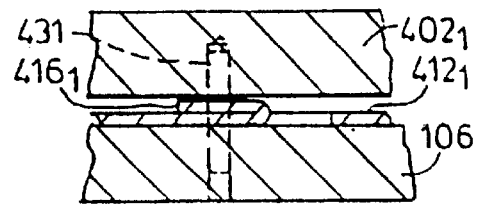
FIG. 4(c) is a sectional elevation through the arrangement of FIG. 4(a) in the direction c—c.

Referring to FIGS. 4(a) and 4(b) the fourth embodiment of bearing arrangement 400 also viewed through the annular body is generally similar to the arrangement 200 of FIGS. 2(a) and (b) in respect of shim means 410 comprising annular shim member 412 having fulcrum ridges $415_1$, $415_2$ ... formed thereon as folded-back tabs $416_1$, $416_2$ ... Each bearing pad $402_1$, $402_2$ ... of the arrangement is secured to the annular body of the carrier means by way of a pair of axially-extending locating members 430, 431 disposed adjacent to, but spaced from, the ends of the fulcrum ridge. The locating members comprise curled, or scrolled, radially contractible spring pins which form an interference fit in co-operating apertures 432–435 in the bearing pad and carrier body whilst passing through the shim member 412, optionally with a clearance fit. The pins, being in line with the fulcrum ridge but spaced from the ends thereof, permit sufficient pivoting of the spaced pad and carrier parts for satisfactory tilting.

Such locating means which locates each bearing pad directly and extends through the shim member associated with each pad to locate it in the vicinity of the pad also permits the use of discrete, circumferentially short, shim members.

Figure 5A:
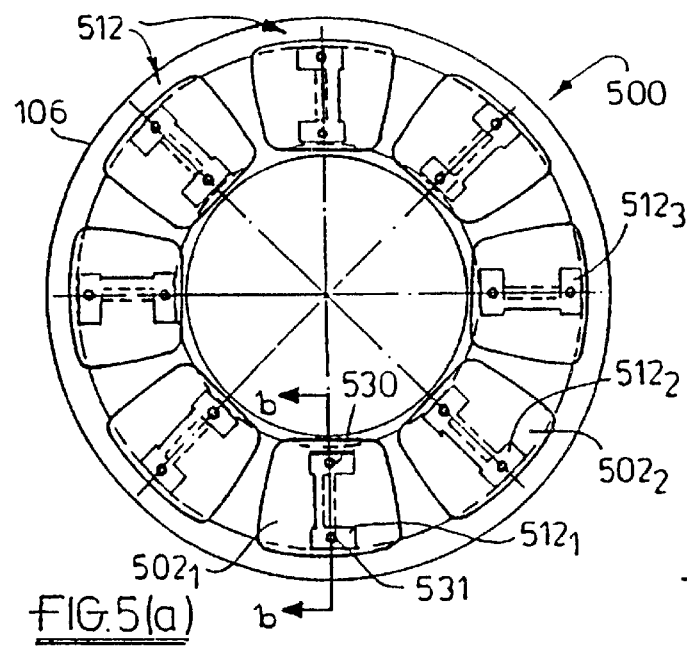
FIG. 5(a) is a plan view of a fifth embodiment of the present invention differing from that of the fourth embodiment in that a discrete and circumferentially short shim member is associated with each discrete bearing pad.
Figure 5B:
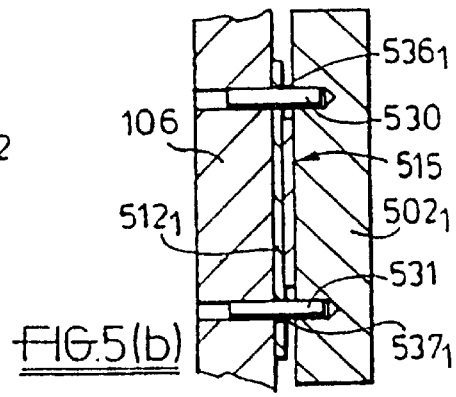
FIG. 5(b) is a sectional elevation through the arrangement of FIG. 5(a) in the direction b—b.

Referring to FIGS. 5(a) and 5(b) these show plan and sectional elevation views similar to FIGS. 4(a) and 4(b), of a fifth embodiment of bearing arrangement 500. This comprises carrier ring 106 and discrete bearing pads $502_1$, $502_2$ ... It differs from the fourth embodiment in respect of the provision of discrete shim members of short circumferential extent. The fulcrum ridge $515_1$, $515_2$ ... is formed on each by folding a tab of shim material back to lie in face-to-face contact as discussed above and the individual shim members are located and retained by locating members 530 and 531, corresponding to the pins 430 and 431 described above, passing through apertures 536, 537 through the shim material in line with, but spaced from the ends of, the fulcrum ridge.

Figure 5C:
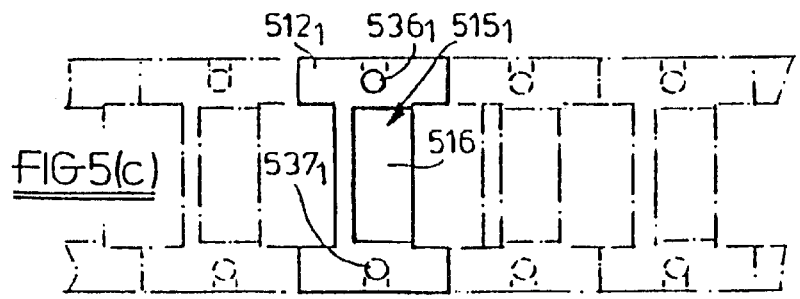
FIG. 5(c) is a plan view of the discrete shim member of FIG. 5(a) and illustrating in ghosted form, its manufacture in a strip of such members from which it is detached for use.

An individual shim member 512, is shown in greater detail in FIG. 5(c), which figure also illustrates how such shim members may be made simply in a continuous strip form from which individual members may be detached for use.

It will be appreciated that such discrete shim members located by locating means in the form of such pins or the like may be employed when the array of bearing pads is present as a unitary ring joined by webs, that is, in the form shown in FIG. 1(a), provided of course that each bearing pad of the ring is located by such members extending through the associated shim member.

Figure 1B:
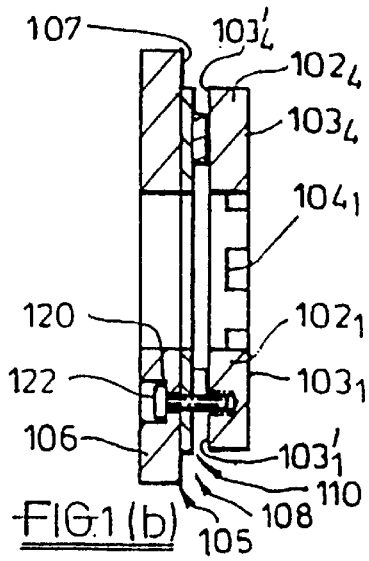
FIG. 1(b) is a sectional elevation through the bearing arrangement of FIG. 1(a) taken in the direction b—b, illustrating also locating means of the bearing pads with respect to the carrier.
Figure 1C:
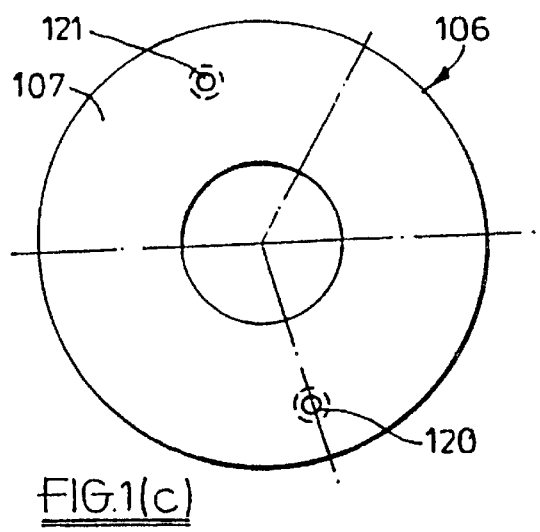
FIG. 1(c) is a plan view of the carrier means annular body of FIG. 1(b)
Figure 1D:
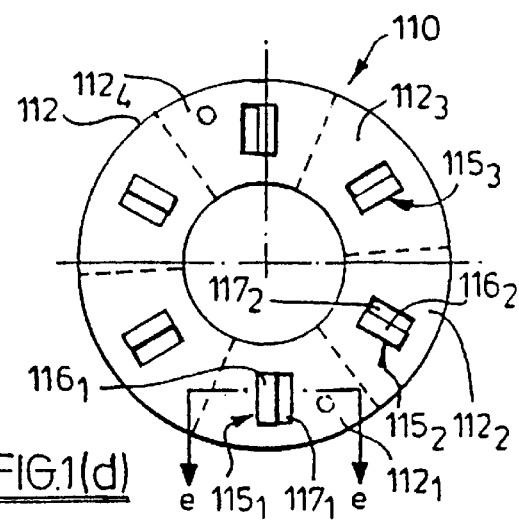
FIG. 1(d) is a plan view of the unitary annular shim member of FIG. 1(b), showing the formation of fulcrum ridges thereon by folding back tabs of the shim member.
Figure 1E:
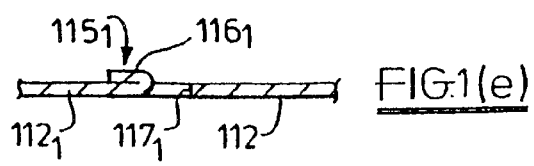
FIG. 1(e) is a sectional elevation through the shim member of FIG. 1(d) along the direction e—e and showing the fulcrum ridge in section.

The above describes locating means in the form of several pins or the like which form an interference fit in both bearing pad and annular body of the carrier, but if desired a more conventional locating means may be effected in which the locating member is secured tightly with respect to the bearing pad only and relatively loosely with respect to the carrier means, analogously to FIG. 1(b).

It will be appreciated that when the locating members have clearance movement with respect to the carrier means then it is less important that the supported surfaces of the bearing pad and surface of the annular body are separated, and in such circumstances it is feasible to have the apertures through the shim member defined through the fulcrum ridge rather than alongside its ends at parts of lesser thickness.

Figure 6A:
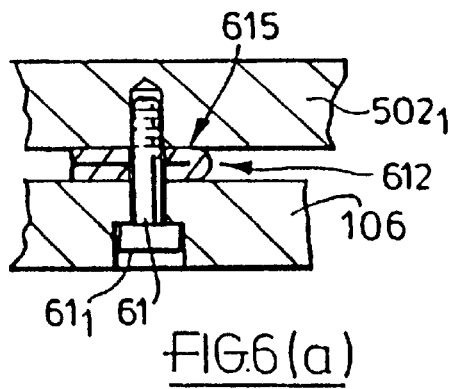
FIGS. 6(a) and 6(b) are sectional elevations illustrating different forms of locating members and fulcrum ridge.
Figure 6B:
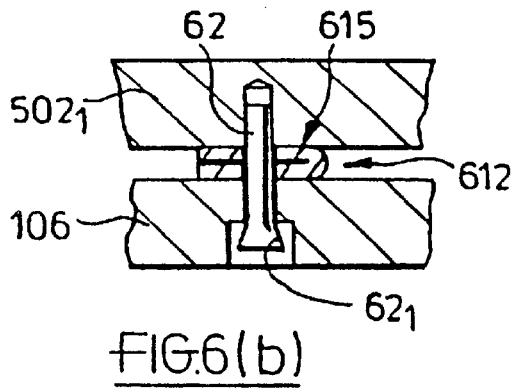

Considering the above outlined variants of locating members and fulcrum ridge, FIG. 6(a) illustrates in sectional elevation respectively a radial locating member that is a profiled pin 61 forced into an interference fit in the bearing pad $502_1$ and a clearance fit in the annular body 106 where it is retained by a head $61_1$. FIG. 6(b) illustrates a radially contractible spring pin 62 that is a clearance fit in the carrier body 106 where it is retained by a splayed end $62_1$. In both cases the pins extend through the fulcrum ridge 615 of shim members 612 formed by folding the shim material to double thickness.

It will be appreciated that it is possible to obtain a face-to-face contact between integral parts of shim material in uniform thickness other than by simple folding back of a tab or end region of a flat strip of the material.

Locating means in the form of the above described pins or like members may extend other that parallel to each other and/or the longitudinal axis. In particular, if such pins are inclined with respect to each other in a radial direction and an interference fit in the bearing pads, they may be a clearance fit in the carrier body and be retained therein without the provision of a splayed or headed end.

Figure 7C:
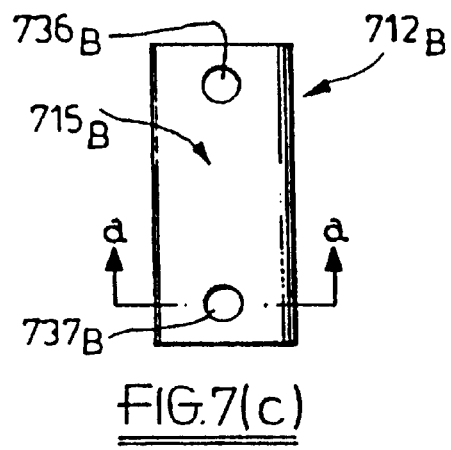
FIGS. 7(c) and 7(d) are plan and sectional elevation views respectively of a variant of the shim member of FIGS. 7(a)
Figure 7D:
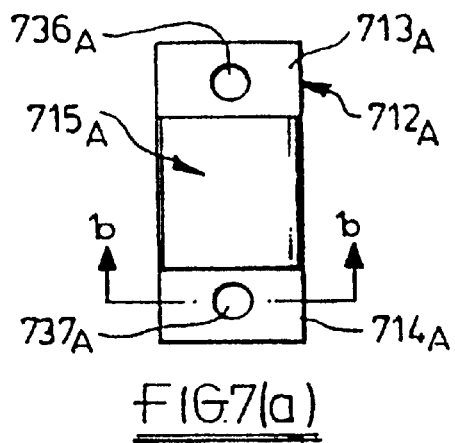
Figure 7A:
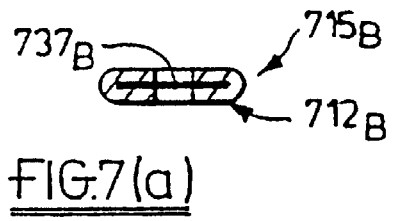
FIGS. 7(a) and 7(b) are plan and sectional elevation views respectively of a form of shim member defined by a flattened tubular body with a fulcrum ridge between locating holes.
Figure 7B:
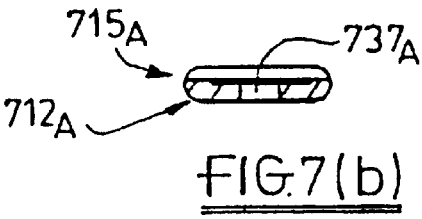

Referring to FIGS. 7(a) and 7(b) these show in plan and sectional elevation respectively a shim member $712_A$ formed by flattening an initially tubular body, the end regions $713_A$, $714_A$ being cut to provide a single thickness through which locating holes $736_A$, $737_A$ pass adjacent the ends of the fulcrum ridge $715_A$. FIGS. 7(c) and 7(d) show similar views of a modified form $712_B$ in which the locating holes $736_B$, $737_B$ extend through the fulcrum ridge, that is, the fulcrum ridge extends for the full length of the member.

It will also be appreciated that if required the shim means may be provided with a fulcrum ridge height or thickness more that provided by a single additional thickness of the shim material.

Figure 8A:
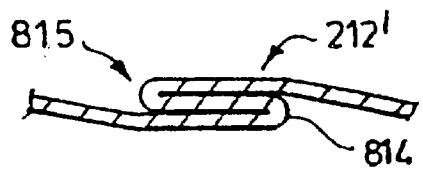

Referring to FIGS. 8(a) to 8(d) which show various options in sectional elevation various options for defining fulcrum ridge thickness, FIG. 8(a) shows how an integral annular shim member ring 212' corresponding to 212 may be pleated by pleat 814 to define a fulcrum ridge 815 adding two thicknesses per pleat.

Figure 8B:
Figure 8C:
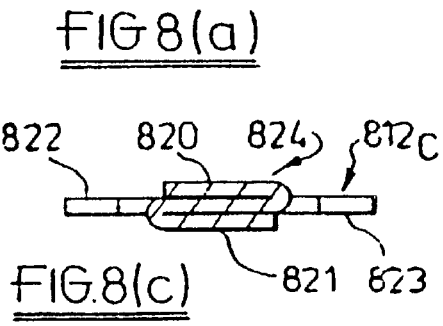
Figure 8D:
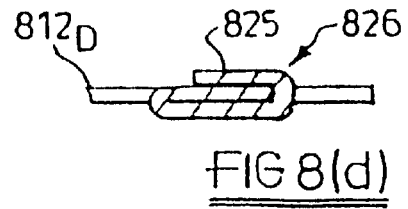

FIG. 8(b) illustrates how an elongate tab (or end of member) 816 may be folded in a pleated manner to increase the fulcrum ridge 817 thickness. FIG. 8(c) illustrates how a shim member $812_c$ may have tabs 820, 821 folded back to lie against opposite surfaces 822, 823 to define fulcrum ridge 824. FIG. 8(d) illustrates how a circumferentially short shim member $812_D$ may have an elongate tab 825 folded repeatedly, that is coiled, about it to increase thickness of fulcrum ridge 826.

I claim:

1. A tilting pad thrust bearing arrangement comprising a plurality of flat parallel faced bearing pads arrayed about a longitudinal axis and supported on a pad carrier, said pad carrier comprising an annular carrier body having a flat support face extending about the longitudinal axis and between said support face and the bearing pads a support member for each pad, said support member including a substantially radially extending fulcrum ridge about which the supported pad can tilt, each support member comprising a shim member formed by a thin flexible shim material of substantially uniform thickness, and wherein each said fulcrum ridge is formed by adjacent integral parts of said thin flexible shim material overlying each other in face to face contact.

2. A arrangement as claimed in claim 1 in which the shim member is substantially planar and the fulcrum ridge comprises a tab cut from, and folded out of, the plane of the shim member to lie against, and parallel to, an adjacent portion of the shim member.

3. An arrangement as claimed in claim 1 in which the fulcrum ridge is formed by at least one pleat of the shim material.

4. An arrangement as claimed in claim 1 in which the fulcrum ridge is formed by folding the shim material against opposite faces of the shim member to define a fulcrum ridge having a thickness at least three times thickness of the shim material.

5. An arrangement as claimed in claim 1 in which the shim members associated with the individual bearing pads of the array are joined to each other as a unitary annular shim member ring.

6. An arrangement as claimed in claim 1 in which the shim material is of steel of no greater that 0.5 mm thickness.

7. An arrangement as claimed in claim 1 in which each bearing pad of the array is secured to the associated shim member and the shim member is secured with respect to the annular carrier body such that the shim member is prevented from moving circumferentially and radially with respect to the annular carrier body and bearing pads.

8. An arrangement as claimed in claim 7 in which the shim member associated with each pad extends in a generally circumferential direction from said fulcrum ridge and is secured to the annular carrier body at a position between the bearing pad and an adjacent pad of the array.

9. An arrangement as claimed in claim 1 in which each shim member is secured to the annular carrier body by a plurality of spot welds.

10. An arrangement as claimed in claim 1 in which each bearing pad of the array is coupled to the annular carrier body, to inhibit relative motion in at least circumferential and radial directions, by at least one locating member extending through the shim means.

11. An arrangement as claimed in claim 10 in which each bearing pad is discrete and coupled to the annular carrier body by way of a pair of locating members extending between the bearing pad and the annular carrier body and spaced apart along the fulcrum ridges of the shim member associated with the pad.

12. An arrangement as claimed in claim 11 in which said locating members of the pair each form an interference fit in the bearing pad and clearance fit in the carrier body and shim member.

13. An arrangement as claimed in claim 11 in which each said bearing pad includes a pair of apertures and locating member comprises a curled spring pin forming an interference fit in a said aperture of the bearing pad.

14. An arrangement as claimed in claim 11 in which the each said bearing pad includes a pair of apertures and locating members comprise curled spring pins forming an interference fit in both an aperture of the bearing pad and of the annular carrier body and are spaced from the ends of the fulcrum ridge.

15. An arrangement as claimed in claim 11 in which each shim member is discrete and of limited circumferential extent with respect to the associated bearing pad and the fulcrum ridge comprises a coiling of the shim material thereabout against opposite faces.

* * * * *